UNITED STATES PATENT OFFICE

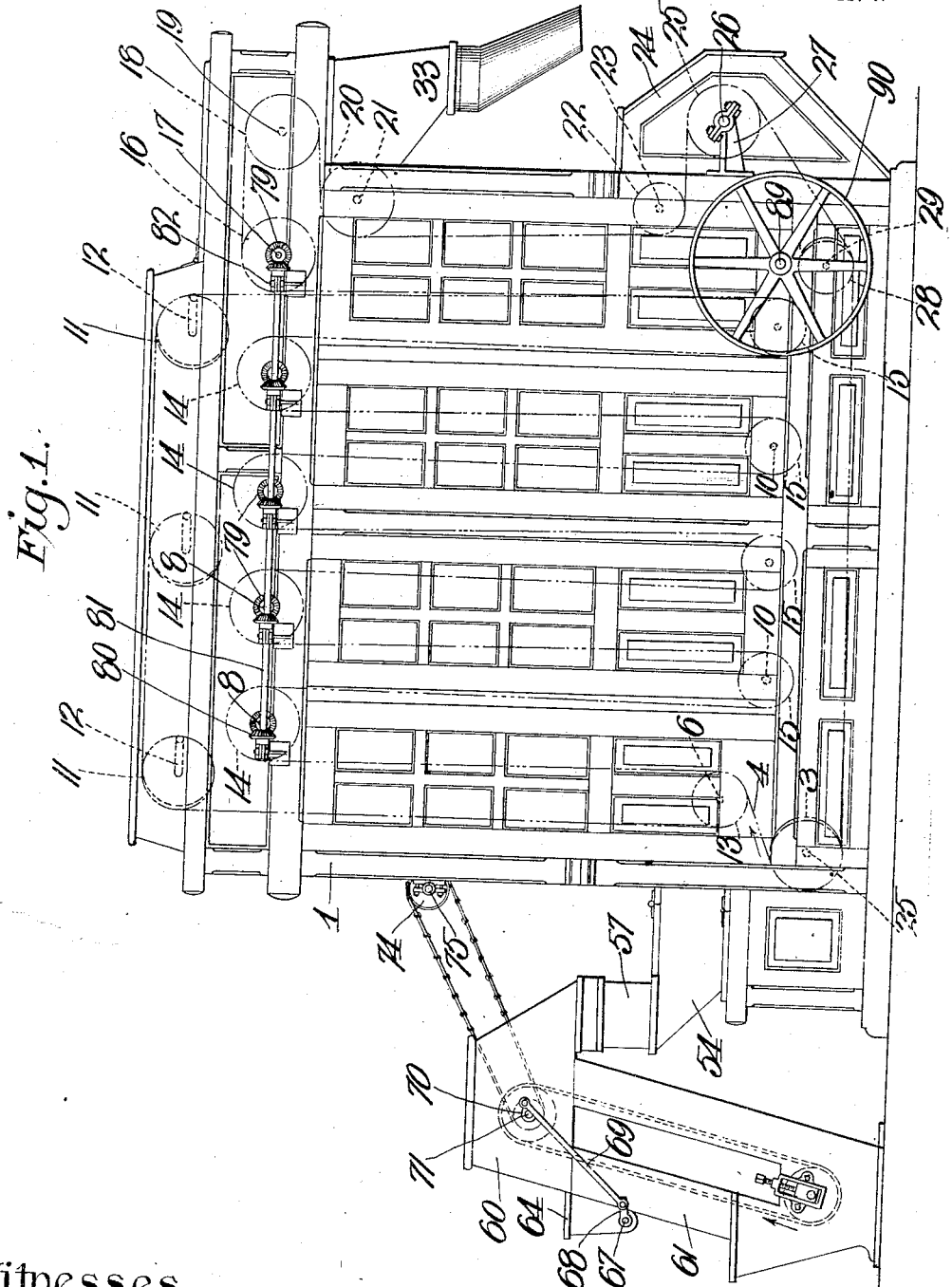

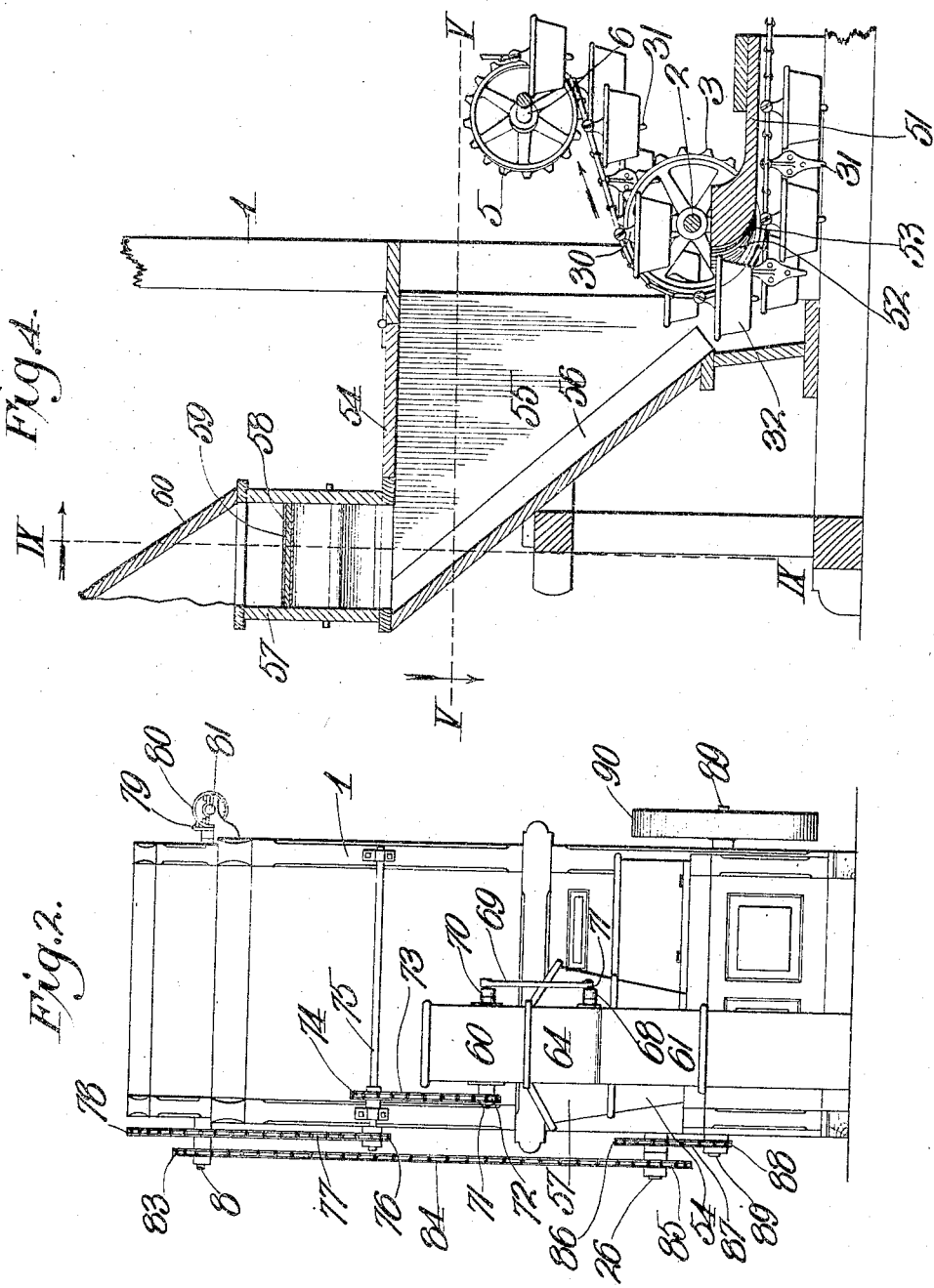

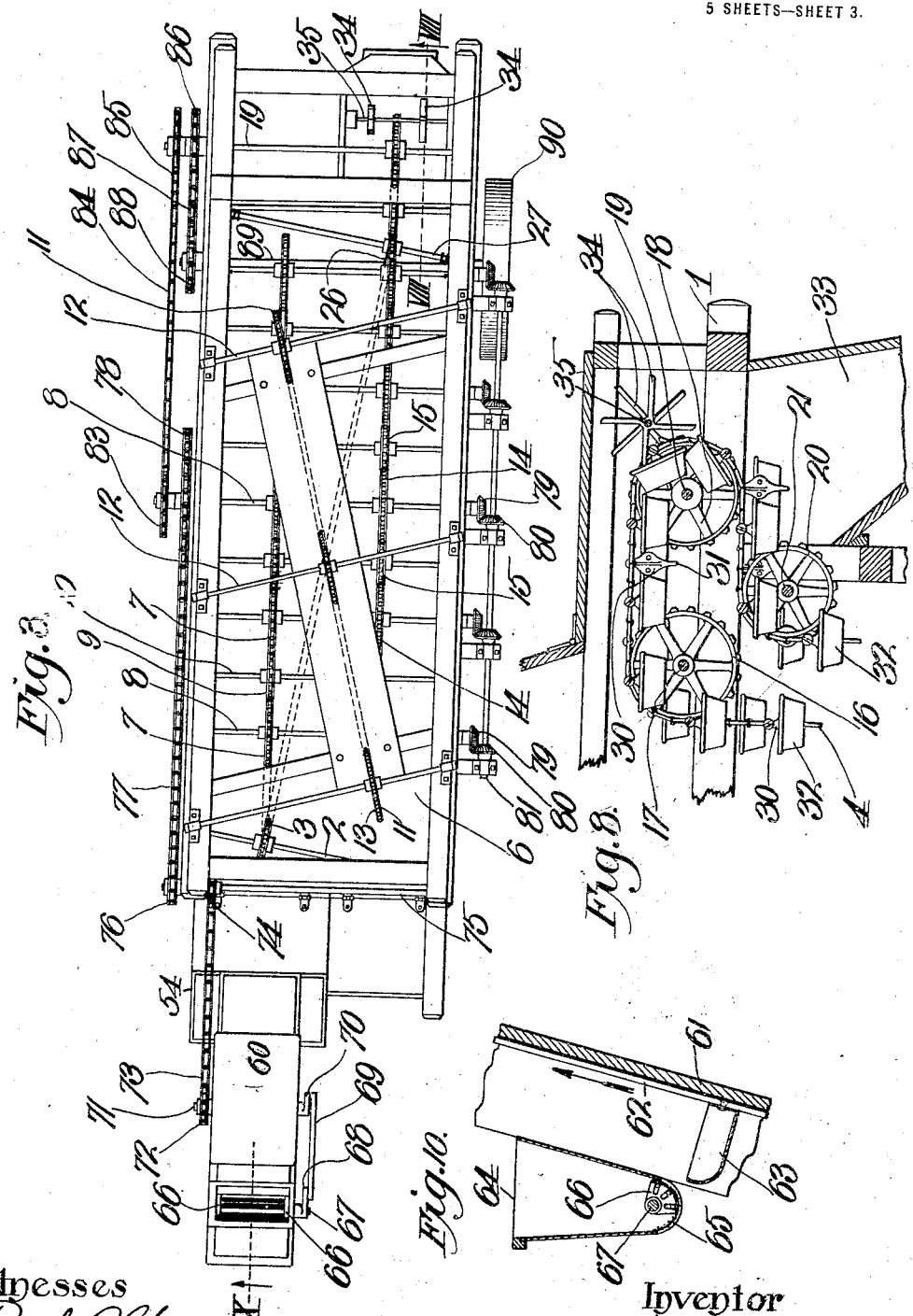

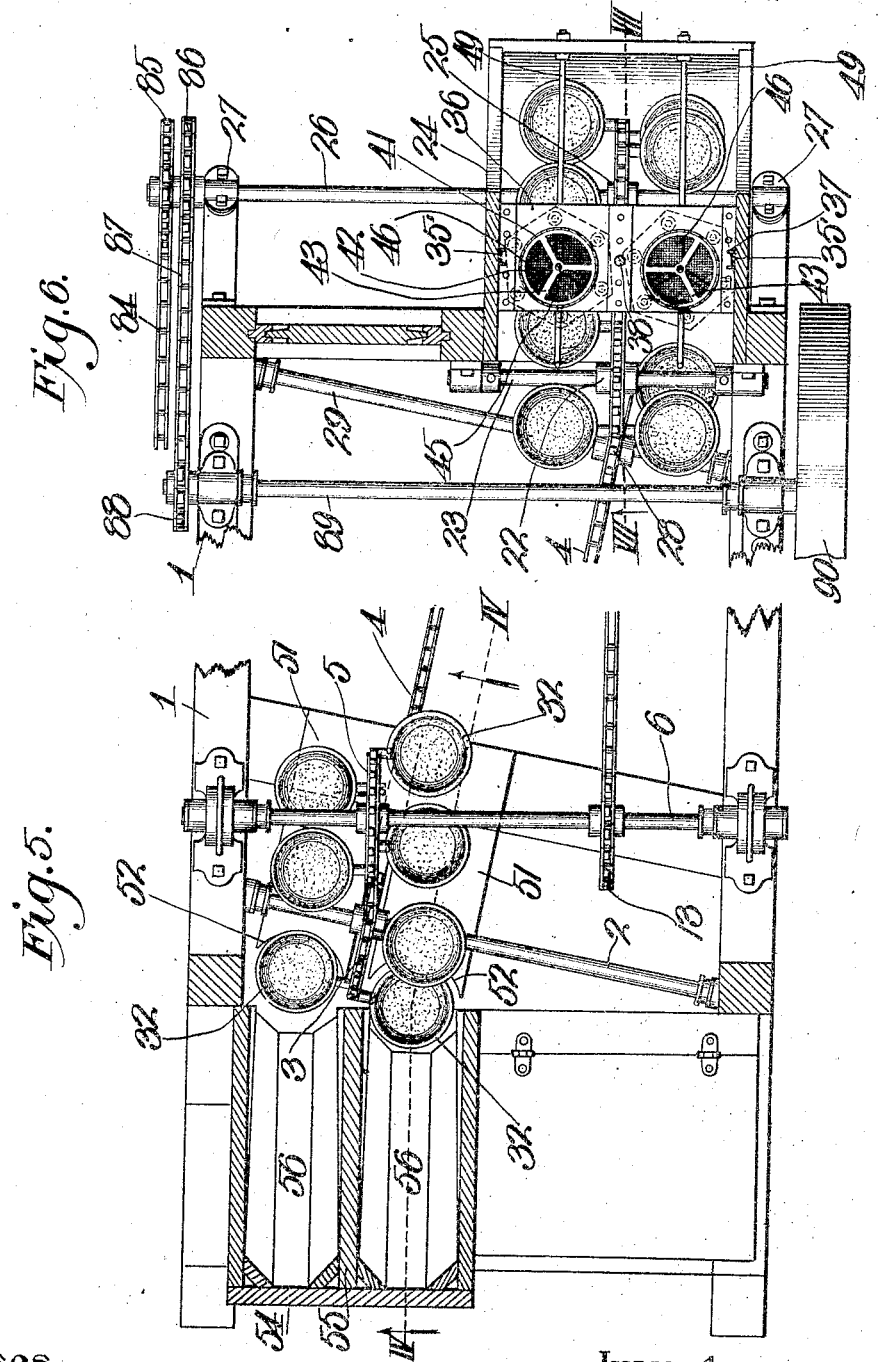

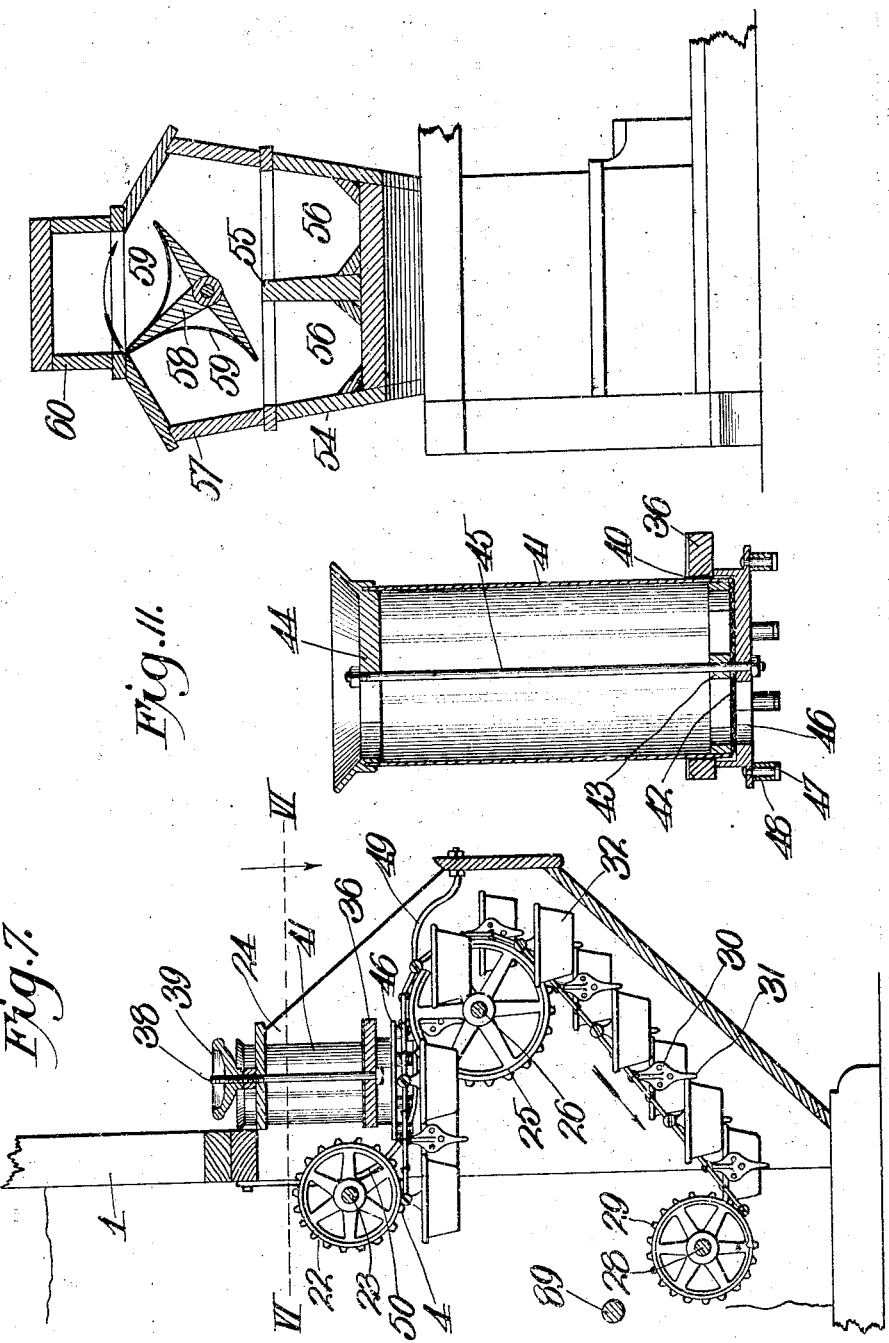

FREDRICK J. WOLFF, OF KANSAS CITY, MISSOURI.

DOUGH-PROOFING MACHINE.

1,147,352.  Specification of Letters Patent.  Patented July 20, 1915.

Application filed November 4, 1912. Serial No. 729,398.

*To all whom it may concern:*

Be it known that I, FREDRICK J. WOLFF, a citizen of the United States, residing at Kansas City, in the county of Jackson and State of Missouri, have invented certain new and useful Improvements in Dough-Proofing Machines, of which the following is a specification.

This invention relates to dough-proofing machines of that class in which unbaked loaves are carried over a tortuous course preliminary to their deposit in baking pans, and my object is to produce an efficient machine of this character equipped with tiltable receptacles or carriers, means for automatically flouring the same, means for automatically depositing the loaves in the floured receptacles or carriers, means for automatically tilting the carriers, and means actuated by each tilting carrier for kicking the loaf out of the following carrier as the same is tilted.

With this general object in view and others as hereinafter appear, the invention consists in certain novel and peculiar features of construction and organization as hereinafter described and claimed, and in order that it may be fully understood reference is to be had to the accompanying drawings, in which—

Figure 1, is a side view of a dough-proofing machine embodying my invention. Fig. 2, is a front view of the same. Fig. 3, is a top plan view of the machine with its top removed. Fig. 4, is an enlarged vertical section on the line IV—IV of Fig. 5. Fig. 5, is a horizontal section on the line V—V of Fig. 4. Fig. 6, is a horizontal section on the line VI—VI of Fig. 7. Fig. 7, is a vertical section on the line VII—VII of Fig. 6. Fig. 8, is a vertical section on the line VIII—VIII of Fig. 3, and shows a part of the top, omitted from Fig. 3. Fig. 9, is a section on the line IX—IX of Fig. 4. Fig. 10, is a section on the line X of Fig. 3. Fig. 11, is a vertical section of one of the flour-holders.

In the said drawings, 1 indicates a large casing and arranged horizontally across and within the lower front end of the same is an obliquely arranged shaft 2, equipped nearer one end than the other, with a sprocket wheel 3, engaged by an endless sprocket chain 4. Said chain extends upwardly and rearwardly and engages a guide sprocket wheel 5, on a transverse shaft 6, and from wheel 5 the chain extends respectively over and under an upper series of sprocket wheels 7, mounted on suitably journaled transverse shafts 8, and a lower series of sprocket wheels 9 mounted on suitably journaled transverse shafts 10, and from the last of the series of wheels 9, the chain extends upward beyond the plane of the series of wheels 7 and extends forwardly over a series of sprocket wheels 11 mounted upon obliquely extending parallel shafts 12, the foremost of said wheels 11 being disposed near the front end of casing 1, and at the opposite side of the longitudinal center thereof from wheel 3, as shown clearly in Fig. 3, and from said foremost wheel 11, the chain extends downwardly and around and engages a sprocket wheel 13, mounted on shaft 6, and then extends upwardly and successively over and under a series of wheels 14 and 15 respectively mounted on shafts 8 and 10, and from the last or rearmost of the wheels 15, the chain extends upwardly and around sprocket wheel 16 mounted upon a suitably journaled transverse shaft 17 paralleling and in the same horizontal plane as shafts 8. From wheel 16 the chain extends rearwardly and around a sprocket wheel 18, mounted on a suitably journaled shaft 19, and under an idler sprocket wheel 22, mounted on a suitably journaled transverse shaft 23, and then extends into a rear housing 24 secured to casing 1, and around a sprocket wheel 25, mounted on a shaft 26, extending horizontally and transversely through said housing and journaled in brackets 27 secured to casing 1.

From wheel 25 the chain extends downwardly and forwardly under and engages a sprocket wheel 28, mounted on a shaft 29, extending transversely through the case in parallelism with shaft 2, and from wheel 28 the chain extends back to wheel 3, it being noted that the wheel 28 is disposed diagonally opposite wheel 3, so that the chain shall extend directly from one of said wheels to another.

30 indicates swing arms pivotally pendent from opposite sides of the chain 4, and arranged at equal distances over and terminating at their lower ends in fingers 31 adapted to engage the hub of wheel 18, in passing over the same, and fitting against the outer sides of the swing arms so as to hang at opposite sides of the chain are receptacles or carriers 32. The size of the hub of wheel 18 is sufficient to cause the fingers 31, in riding thereover, to overturn the receptacles 32, as shown in Fig. 8, for the purpose of dumping the unbaked loaves down through a chute 33. To guard against the unbaked loaves sticking in the receptacles as the latter are overturned as explained, each receptacle is provided with a roughened inner surface produced by securing thereon in any suitable manner a vegetable grit, such as corn, rice or wheat grits, as I have found in practice that with the interior of the receptacles properly roughened, the unbaked loaves will almost invariably fall freely from the receptacles as the latter are successively overturned as hereinbefore mentioned. It is necessary that the grit shall be of a vegetable character so that should any of the grit adhere to the loaf, it will not be noticeable to the consumer, and in this connection it should be mentioned, that by roughening the interior surface of the receptacles, there is no necessity for even dusting the same with flour as hereinafter described. As an additional precaution, however, in insuring the discharge of the unbaked loaves from the receptacles, as the same are overturned, I provide a pair of four-armed or cross-shaped kickers 34, secured on a suitably journaled shaft 35, one of the kickers being arranged in the longitudinal planes of each series of receptacles, so that as a receptacle is caused to tilt as its respective finger 31 comes in contact with the hub of the wheel 18, it is engaged by one of the arms of the adjacent kicker, said arm becoming embedded slightly in the loaf in said receptacle so that the kicker is caused to turn by the continued travel of the chain or conveyer. Before the engaged arm of the kicker is disengaged from the loaf, one of the arms of the companion kicker is caused to enter the next receptacle on the other side of the conveyer whereby positive force is applied on the second kicker for the purpose of causing the preceding arm of the other kicker to dislodge the unbaked loaf from the first-named receptacle, so that the loaves shall successively fall through the chute 33 from which point they are caught by hand or otherwise and afterward deposited in the baking pans, not shown.

Immediately after the dumping operation described is accomplished, the receptacles are conveyed from under shaft 19 and swing by gravity to their original upright position and in traveling from a point below sprocket wheel 22 to sprocket wheel 25 to pass under sifters. There are two of these sifters arranged side by side one in the vertical plane of the series of receptacles at one side of the chain or conveyer and the other in the vertical plane of the series of receptacles at the other side of said chain or conveyer. The sifter mechanism is constructed as follows 35' is a pair of channeled vertical guides secured within and to the side of housing 24. 36 is a board arranged horizontally and extending from one side to the other and provided with end grooves 37 slidingly receiving the guides 35' and to adjust said board vertically, an inverted bolt 38 extends up through it and the top of the housing 24 (see Fig. 7), and is engaged at its upper end by a hand wheel 39, whereby said board can be raised or lowered. The board is provided with a hole 40 in the vertical plane of each series of said receptacles, and is of approximately the same diameter as the receptacles, and extending through said holes and secured in any suitable manner to said board, are flour holders 41 provided foraminous bottoms 42, and spiders 43 resting on the foraminous bottoms. The holders are also provided with spiders 44 at their upper ends and extending centrally through the spiders and the foraminous bottoms 42, are tie-rods 45, and journaled on said tie rods and fitting against the undersides of said foraminous bottoms, are spider scrapers 46, provided with depending pins 47 equipped preferably with antifriction rolls 48, the arrangement being such that as each unbaked loaf receptacle passes under a holder 41, the upper end of the arm or hanger of said last-named receptacle strikes one of the pins or the rollers of the overlying scraper spider and imparts turning movement to the same, this turning movement resulting in sifting a sufficient quantity of flour from said holder down into the underlying unbaked loaf receptacle to thoroughly dust the same. To guard against any possibility of one of said receptacles passing under the holders in a tilted position, so as to perhaps pass without receiving a charge of flour from the holders, a rod 49 extends longitudinally between the bottom of each holder and the underlying receptacles 32, and terminates in an upturned curved portion 50, which portion, as above suggested, insures the receptacles 32 at the same side of the conveyer, assuming a horizontal position as they pass under the corresponding flour holder.

After the receptacles 32 receive the flour, which of course is to guard against the sticking of the unbaked loaves in said receptacles, though the dusting is not absolutely essential with the receptacles roughened inside as explained, they travel diagonally forward and to the right and pass under a pair of horizontal guards 51 provided with segmental recesses 52 in their front ends, and to insure the retention of said receptacles in a horizontal position as they are carried by the conveyer upwardly and around shaft 2, the guards 51 are rounded at their ends as at 53. As the receptacles attain substantially the plane of the front ends of the guards 51, they each receive an unbaked loaf.

The means for delivering the unbaked loaves into the receptacles 32 is constructed as follows: 54 is a hopper divided by partition 55 into two similar passages or chutes 56 which terminate at their lower ends in the horizontal plane of the upper ends of the guards 51 and a distance forward of the same slightly greater than the diameter of the receptacles 32 and in this connection it will be noted by reference to Fig. 4, that under the impact of a loaf shot into a receptacle, the latter cannot turn over and dump the loaf because its rearward swinging movement is almost instantly arrested by contact with the adjacent portion of the front ends of the guards 51.

To deliver the loaves automatically and alternately into the chutes 56, a box 57 is mounted upon the hopper and pivoted for oscillatory movement in the box at a point vertically over the partition 55 is an inverted T-shaped deflector 58 and at each side of the stem of the deflector, a curved plate 59 extends from the upper part of said stem to the outer end of the corresponding side portion of the head of the deflector, the arrangement being such that as a loaf drops upon one of the plates 59, it overbalances the deflector and causes the same to swing as indicated by the arrow Fig. 9, so as to raise the originally depressed portion of the head of the deflector and lower the elevated portion thereof, the lowering of the last-named head resulting in permitting the loaf to drop down into the underlying chute 56. The next loaf obviously reverses the action of the deflector and falls down into the other chute 56, as will be readily understood.

To deliver the loaves into the top of the box so that they shall in falling strike and operate the deflector as explained, a hood 60 forming the upper part of an endless conveyer casing 61 is employed. 62 is an endless conveyer extending through the casing 61 and provided with a cup 63, in which the loaves are deposited in any suitable manner and for flouring the said cup and the loaves therein, a flour receptacle 64 is secured to the casing 61 and is provided with a foraminous bottom 65 so arranged that flour dropping through the same will fall into the cup 63 and upon the loaves therein. The flour receptacle contains an oscillatory sifting device 66, as shown, scraping upon the foraminous bottom 65 and to operate said sifting device 66, its shaft 67 carries a crank arm 68 connected by a link 69 with the shorter crank 70 on a shaft 71, in the upper part of the elevator 62. This shaft 71 is equipped with a sprocket wheel 72 connected by a sprocket chain 73, with a sprocket wheel 74 on a transverse shaft 75 journaled on the casing 1.

76 is a second sprocket wheel on shaft 75 connected by a chain 77 with a large sprocket wheel 78 on the central shaft of the series 8, hereinbefore described, and said shaft and the other shafts of said series and shafts 17 are equipped with bevel gears 79 meshing with bevel gears 80 on a longitudinal shaft 81, journaled in suitable bearings 82 carried by the casing. The shaft carrying wheel 78 carries a smaller sprocket 83, connected by a chain 84 with a sprocket wheel 85 mounted on shaft 26, and said shaft is equipped with a sprocket wheel 86, connected by a chain 87 with sprocket wheel 88 on a shaft 89 equipped with a belt wheel 90 to which power is transmitted from any suitable source.

Assuming that the machine is in operation, it will be seen that the conveyer for the unbaked loaf receptacles travels in the direction indicated by arrows adjacent to the conveyer in the various figures, and that the elevator 62 discharges unbaked loaves at regular intervals into the box 57 and that said loaves alternately operate the deflector so that the same shall permit them to alternately pass down through chutes 56, the parts being so timed that at the moment a loaf attains the lower end of a chute one of the receptacles in the same vertical plane as said chute, is passing upward adjacent to the front end of its respective guide 51 so that it will be impossible for such receptacle under the impact of the loaf to turn over or spill the loaf. Each loaded receptacle then follows the tortuous course described by the conveyer in passing over wheels 7 and 9 and then passes upwardly over the shafts 12 and diagonally forward under shaft 6, from which point it again travels in a tortuous course over shafts 8 and under shafts 10. After passing under the rearmost of the shafts 10, the receptacle passes upward and rearwardly over shafts 17 and 19 and in passing around said last-named shaft is tilted or dumped as hereinbefore explained to discharge the loaf through chute 33. The receptacle immediately swings to an upright position and then passes forwardly over the idler shaft 21, downwardly under idler shaft 23, and rearwardly into the housing 24, where it receives flour from the holders 41 after which it passes downwardly over shaft 26 and then downwardly and forwardly under shaft 29 and diagonally forward to the starting point, the plane of the last-named diagonal travel intersecting that of the first-named travel about midway the length of the casing.

From the above description it will be apparent that I have produced a dough-proofing machine embodying the features of advantage enumerated as desirable and while I have illustrated and described the preferred embodiment of the invention I wish it to be understood that I reserve the right to make all changes falling within the spirit and scope of the invention as defined by the appended claims.

I claim:

1. In a dough-proofing machine, an endless conveyer, a series of dough receptacles carried by said conveyer, means acting automatically at a certain point in the travel of the conveyer for successively overturning said receptacles, and means adapted to enter each receptacle during its overturning operation to engage the dough and facilitate the discharge thereof from the receptacle.

2. In a dough-proofing machine, an endless conveyer, a series of dough receptacles pivotally carried by said conveyer, means acting automatically at a certain point in the travel of the conveyer for successively swinging and thereby overturning said receptacles, and a series of fingers adapted to enter each receptacle while being overturned to engage the dough and coöperate with said means to discharge the dough from the receptacle.

3. In a dough-proofing machine, an endless conveyer, a series of dough receptacles carried by said conveyer and forming two parallel rows arranged side by side, means acting automatically at a certain point in the travel of the conveyer for successively overturning said receptacles, and means associated with each of said rows of receptacles and adapted to enter the receptacles as they are overturned to engage the interior thereof and facilitate the discharge of dough therefrom, said last-named means and said receptacles being constructed and arranged so that the engagement of the receptacles of one row with its associated means will actuate the said associated means of the other row.

4. In a dough proofing machine, an endless conveyer, a series of dough receptacles carried by said conveyer and forming two parallel rows arranged in staggered relation, means acting automatically at a certain point in the travel of the conveyer for successively overturning said receptacles, and a series of fingers associated with each of said rows of receptacles for engaging the interior of the same as they are overturned and facilitating the discharge of the dough therefrom, said series of fingers being connected for movement together so that the engagement of one series by an overturning receptacle will actuate the other series of said fingers.

5. In a dough-proofing machine, a casing, a chute communicating with the front end of the casing, a discharge spout for the casing, a tortuous endless conveyer extending through the casing and disposed at one point adjacent the lower end of the chute and at another point over said discharge spout, receptacles pivotally suspended from the said conveyer, means to operate said conveyer to carry the receptacles successively upward past the lower end of the chute, so that each will receive an unbaked loaf therefrom, means to overturn each receptacle as it passes over the spout to dump the unbaked loaf through the spout, and means adjacent the lower end of the chute and at the opposite side of the receptacles from the chute as the receptacles move upward past the chute to limit the swinging movement imparted to such receptacles under the impact thereon of loaves from the chute to insure the retention of the loaves in the receptacles.

6. In a dough proofing machine, a casing, a chute communicating with the front end of the casing, a discharge spout for the casing, a tortuous endless conveyer extending through the casing and disposed at one point adjacent the lower end of the chute and at another point over said discharge spout, receptacles pivotally suspended from said conveyer, means to operate said conveyer to carry the receptacles successively upward past the lower end of the chute, so that each will receive an unbaked loaf therefrom, means to overturn each receptacle as it passes over the spout to dump the unbaked loaf through the spout, and a substantially horizontal guide overlying the dough receptacles adjacent the lower end of the chute and provided at its front end with a segmental recess into which the receptacles project and adapted to be struck by said receptacles and prevent undue swinging movement thereof imparted to them by the impact therein of loaves from the chute.

In testimony whereof I affix my signature, in the presence of two witnesses.

FREDRICK J. WOLFF.

Witnesses:
H. C. RODGERS,
G. Y. THORPE.